United States Patent [19]
Brock et al.

[11] 3,840,777
[45] Oct. 8, 1974

[54] VEHICLE EXTERIOR LIGHTING SYSTEM CONTROL CIRCUIT

[75] Inventors: Eugene W. Brock; Dale E. Schelling, both of Anderson, Ind.

[73] Assignee: General Motors Corporation, Detroit, Mich.

[22] Filed: June 11, 1973

[21] Appl. No.: 368,634

[52] U.S. Cl.................................. 315/82, 315/159
[51] Int. Cl............................................... B60q 1/08
[58] Field of Search....... 315/82, 83, 149, 156, 157, 315/159

[56] References Cited
UNITED STATES PATENTS
3,628,085  12/1971  Brock .................................. 315/82

Primary Examiner—John Kominski
Assistant Examiner—James B. Mullins
Attorney, Agent, or Firm—Richard G. Stahr

[57] ABSTRACT

A vehicle exterior lighting system control circuit wherein the collector-emitter electrodes of the output transistor of a Schmitt trigger circuit are connected in series with the operating coil of a normally open double pole-single throw relay across the vehicle battery. A light sensitive control element is responsive to conditions of ambient light less than a predetermined level to operate the trigger circuit to the operating state in which the output transistor is conductive, thereby energizing the operating coil of the relay which energizes the vehicle exterior lighting system circuit, and to conditions of ambient light greater than the predetermined level to operate the trigger circuit to the other operating state in which the output transistor is not conductive. A time delay circuit is disposed between the trigger circuit and the light sensitive control element for introducing a delay in the operation of the trigger circuit from either operating state to the other and another time delay circuit is in operative relationship with the base electrode of the trigger circuit output transistor for maintaining the output transistor conductive for a predetermined period of time after the ignition switch has been operated to the open condition.

3 Claims, 1 Drawing Figure

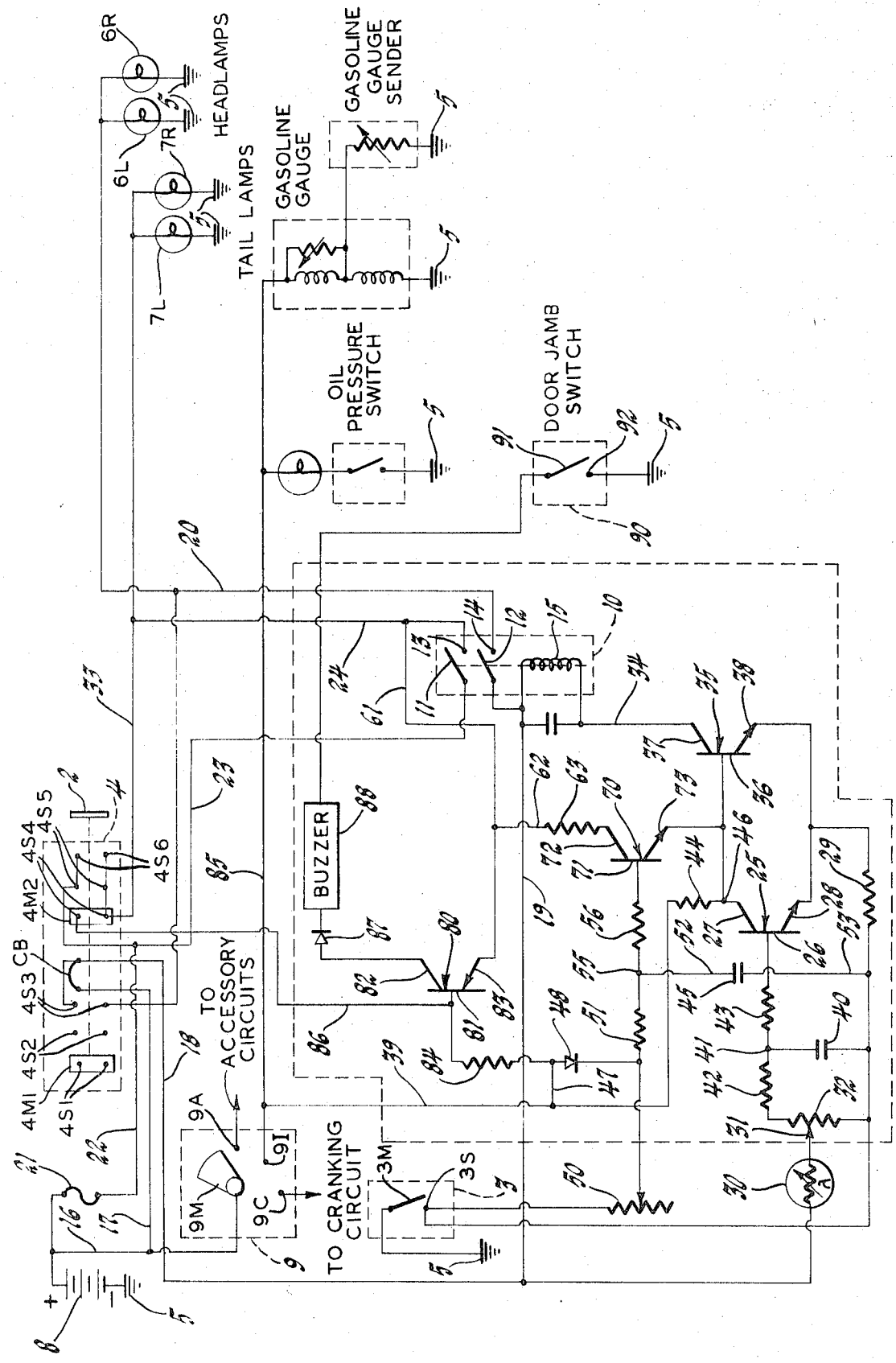

VEHICLE EXTERIOR LIGHTING SYSTEM CONTROL CIRCUIT

This invention is directed to a vehicle exterior lighting system control circuit and, more particularly, to a control circuit of this type which is responsive to conditions of ambient light greater than a predetermined level for automatically deenergizing the vehicle exterior lighting system and to conditions of ambient light less than the predetermined level for automatically energizing the vehicle exterior lighting system which includes a feature for maintaining the exterior lighting system energized for a predetermined period of time after the ignition switch has been operated to the electrical circuit open condition.

Many modern automobiles are provided with a vehicle exterior lighting system control circuit which automatically energizes the exterior lighting system with conditions of ambient light less than a predetermined level and automatically extinguishes the exterior lighting system with conditions of ambient light greater than the predetermined level. To prevent the unnecessary energization of the vehicle exterior lighting system in the presence of short term conditions of ambient light less than the predetermined level, as may be encountered in a tunnel or highway overpass, and to prevent the unnecessary extinguishing of the vehicle exterior lighting system during short periods of ambient light level greater than the predetermined level, as may be encountered during periods of heavy approaching traffic or lighted highway intersections, a delay circuit which maintains the condition of the vehicle exterior lighting system for a short period of time after a change of ambient light conditions of short duration, is provided. With many prior art systems, the two required delay circuits were provided by two separate RC timing circuits and complex switching arrangements which inserted these circuits into the main control circuit at the proper time. The provision of a more reliable and less costly system than those of the prior art is desirable.

It is, therefore, an object of this invention to provide an improved vehicle exterior lighting system control circuit.

It is another object of this invention to provide an improved vehicle exterior lighting system control circuit which employs a single RC timing circuit network for providing the necessary delay of the energization of the vehicle exterior lighting system with conditions of ambient light of short duration less than a predetermined level and for the delay of the extinguishing of the vehicle exterior lighting system with conditions of ambient light of short duration greater than the predetermined level.

It is an additional object of this invention to provide an improved vehicle exterior lighting system control circuit which employs a single RC timing circuit network which prevents the unnecessary energization of the vehicle exterior lighting systems with conditions of ambient light of short duration less than a predetermined level and for preventing the unnecessary extinguishing of the vehicle exterior lighting system with conditions of ambient light of short duration greater than a predetermined level and a separate timing circuit for maintaining the vehicle exterior lighting circuit energized for a predetermined period of time after the ignition switch has been operated to the electrical circuit open condition.

In accordance with this invention, a vehicle exterior lighting system control circuit is provided wherein a light sensitive control element, with conditions of ambient light less than a predetermined level, operates an electrical trigger circuit to one operating state which establishes an energizing circuit for the operating coil of a relay to complete an energizing circuit for the vertical exterior lighting system and, with conditions of ambient light greater than the predetermined level, operates the trigger circuit to the other operating state in which the energizing circuit for the relay operating coil is interrupted to extinguish the vehicle exterior lighting system.

For a better understanding of the present invention, together with additional objects, advantages and features thereof, reference is made to the following description and accompanying single FIGURE drawing.

As point of reference or ground potential is the same point electrically throughout the system, it has been illustrated in the FIGURE by the accepted schematic symbol and reference by the numeral 5.

Referring to the FIGURE, the vehicle exterior lighting system control circuit of this invention is schematically set forth in combination with the vehicle headlamps 6R and 6L, and tail lamps 7R and 7L, a source of electrical power, which may be the vehicle battery 8, and an ignition switch 9 having at least two electrical contacts operable to the electrical circuit open and closed conditions.

The ignition switch 9 may be a conventional automotive type ignition switch having an open or "Off" position, at which it is shown in the FIGURE, a "Run" position at which movable contact 9M is closed to stationary contacts 9A and 9I and a "Crank" position at which movable contact 9M is closed to stationary contacts 9I and 9C. As is well known in the art, ignition switches of this type are spring biased to automatically return to the "Run" position wherein movable contact 9M is closed to stationary contacts 9A and 9I when the torque applied to the ignition key is released. For purposes of this specification, the contacts of the ignition switch operable to the electrical circuit open and closed conditions are movable contact 9M and stationary contact 9I.

To operate the vehicle exterior lighting system in a normal manner, a conventional automotive type headlamp switch 4 may be provided. Headlamp switch 4 includes two gang-operated movable contacts 4M1 and 4M2 which are simultaneously operated horizontally, as viewing the FIGURE, to the right when operating knob 2 is pulled to the right and to the left when operating knob 2 is moved to the left. Headlamp switch 4 is shown in the FIGURE in the "Off" position. To energize only the tail lamp circuit, operating knob 2 is moved to the right until movable contacts 4M1 and 4M2 are in electrical contact with respective stationary contact pairs 4S2 and 4S5 and to energize both the tail lamp and headlamp circuits, operating knob 2 is moved further to the right until movable contacts 4M1 and 4M2 are in electrical contact with respective stationary contact pairs 4S3 and 4S6, as is well known in the automotive art.

When it is desired to enable the vehicle exterior lighting system control circuit of this invention to automatically energize the vehicle exterior lighting system with conditions of ambient light less than a predetermined level and to automatically deenergize the exterior lighting systems with conditions of ambient light greater than the predetermined level while the ignition switch is operated to the electrical circuit closed condition, movable contact 9M closed to stationary contact 9I, movable contact 3M of a conventional single pole-single throw "On-Off" switch 3 is closed to stationary contact 3S to place ground upon the control circuit.

To establish energizing circuits for the vehicle headlamps 6L and 6R and tail lamps 7L and 7R across battery 8, an electrical switching device of the type operable to the electrical circuit closed condition in response to an electrical current is provided. Without intention or inference of a limitation thereto, this electrical switching device may be a conventional double pole-single throw electrical relay 10 having two movable contacts 11 and 12, two stationary contacts 13 and 14 and an operating coil 15. Upon the energization of operating coil 15, an energizing circuit is established for headlamps 6L and 6R by movable contact 12 and stationary contact 14 of relay 10 through a circuit which may be traced from the positive polarity terminal of battery 8, through leads 16 and 17, circuit breaker CB of headlamp switch 4, leads 18 and 19, movable contact 12 and stationary contact 14, lead 20, headlamps 6L and 6R in parallel and point of reference or ground potential 5 to the negative polarity terminal of battery 8 and an energizing circuit is established for tail lamps 7L and 7R by movable contacts 11 and stationary contact 13 through a circuit which may be traced from the positive polarity terminal of battery 8 through tail lamp fuse 21, leads 22 and 23, movable contact 11 and stationary contact 13, leads 24 and 33, tail lamps 7L and 7R in parallel and point of reference or ground potential 5 to the negative polarity terminal of battery 8.

To establish and interrupt a circuit for the flow of electrical current for the electrical switching device while the ignition switch 9 is operated to the electrical circuit closed condition, movable contact 9M closed to stationary contact 9I, an electrical trigger circuit having two operating states is provided. Without intention or inference of a limitation thereto, this electrical trigger circuit may be a conventional Schmitt trigger circuit comprising type NPN transistors 25 and 35, each having the usual base, collector and emitter electrodes. The base electrode 36 of output transistor 35 is connected to the collector electrode 27 of input transistor 25 and the respective emitter electrodes 28 and 38 are connected to point of reference or ground potential 5 through common emitter resistor 29 and "On-Off" switch 3. The collector electrode 37 and the emitter electrode 38 of output transistor 35 are connected in series with operating coil 15 of relay 10 across battery 8 through a circuit which may be traced from the positive polarity terminal of battery 8, through leads 16 and 17, circuit breaker CB of headlamp switch 4, leads 18 and 19, operating coil 15, lead 34, the collector-emitter electrodes of output transistor 35, common emitter resistor 29, the closed contacts of "On-Off" switch 3 and point of reference or ground potential 5 to the negative polarity terminal of battery 8. During one operating state of the trigger circuit, output transistor 35 is conductive through the collector-emitter electrodes for establishing a circuit for the flow of electrical current through operating coil 15 and during the other operating state, output transistor is not conductive through the collector-emitter electrodes for interrupting the circuit for the flow of electrical current through operating coil 15. As the circuit through which collector-emitter potential is applied across input transistor 25 and through which base drive current is supplied to output transisotr 35 is completed only while movable contact 9M of ignition switch 9 is electrically closed to stationary contact 9I, the trigger circuit can establish and interrupt the circuit for the flow of energizing current to operating coil 15 of relay 10 only while the ignition switch is operated to the electrical circuit closed condition.

So that the trigger circuit may be operated to the one operating state during which output transistor 35 is conductive through the collector-emitter electrodes to establish a circuit for the flow of energizing current through operating coil 15 of relay 10 with conditions of ambient light less than a predetermined level and to the other operating state during which output transistor 35 is not conductive through the collector-emitter electrodes to interrupt the circuit through which energizing current is supplied to operating coil 15 with conditions of ambient light greater than the predetermined level, a light sensitive control element responsive to conditions of ambient light is provided. This light sensitive control element may be a conventional photocell 30 of the type well known in the art characterized by an increase of electrical resistance with a decrease of ambient light level and a decrease of electrical resistance with an increase of ambient light level. Photocell 30 is connected across battery 8 through leaad 18, movable contact 31 of potentiometer 32, the closed contacts of "On-Off" switch 3 and point of reference or ground potential 5.

Assuming that the vehicle is at a location in which the condition of ambient light is greater than the predetermined level, which may be determined by adjusting movable contact 31 of potentiometer 32, the resistance value of photocell 30 is low. Consequently, the potential appearing across junction 41 and point of reference or ground potential 5, which is determined by the voltage divider consisting of photocell 30, that portion of the resistance between movable contact 31 and the terminal end of potentiometer 32 connected to resistor 42 and resistor 43, charges capacitor 40 to a direct current potential level of sufficient magnitude to produce base-emitter drive current through type NPN input transistor 25, the base 26 of which is connected to junction 41 through current limiting resistor 43. Upon the operation of the ignition switch 9 to the electrical circuit closed condition, battery 8 is placed across the collector-emitter electrodes of type NPN input transistor 25 in the proper polarity relationship to produce collector-emitter current flow through a type NPN transistor, consequently, input transistor 25 conducts through the collector-emitter electrodes. This circuit may be traced from the positive polarity of battery 8, through lead 16, movable contact 9M and stationary contact 9I of ignition switch 9, lead 39 current limiting resistor 44, the collector-emitter electrodes of transistor 25, common emitter resistor 29, the closed contacts of "On-Off" switch 3 and point of reference of ground potential 5. With input transistor 25 conducting through the collector-emitter electrodes, the potential upon the base electrode 36 of output transistor 35 is substantially equal to that upon the emitter electrode 38 thereof, less the small drop across saturated input transistor 25, a condition which maintains output transistor 35 in a not conductive state to interrupt the circuit through which energizing current is supplied to operating coil 15 of relay 10. Consequently, the vehicle exterior lighting system is not energized. Assuming that the vehicle exterior lighting system is not energized and that the vehicle is being operated under conditions of ambient light which is changing from a level greater than to a level less than the predetermined level, the resistance value of photocell 30 increases. As the resistance value of photocell 30 increases, more of the battery potential is dropped thereacross, consequently, the potential appearing across junction 41 and point of reference or ground potential 5 decreases until it reaches a value at which it is no longer of sufficient magnitude to maintain base-emitter current flow through input transistor 25. At this time, input transistor 25 extinguishes through the collector-emitter electrodes and the potential across junction 46 and point of reference or ground potential 5 increases to a level of sufficient magnitude to produce base-emitter drive current through type NPN output transistor 35. As the battery 8 potential is applied across the collector-emitter electrodes of output transistor 35, through a circuit previously described, in the proper polarity relationship to produce collector-emitter current through a type NPN transistor, the trigger circuit is operated to the one operating state during which output transistor 35 conducts through the collector-emitter electrodes to establish the circuit through which energizing current is supplied to the operating coil 15 of relay 10. With operating coil 15 energized, movable contacts 11 and 12 are operated into electrical engagement with respective stationary contacts 13 and 14 to energize the exterior vehicle headlamps and tail lamps with conditions of ambient light greater than a predetermined level, through circuits previously described.

Assuming that the vehicle exterior lighting system is energized and that the vehicle is being operated under conditions of ambient light which is changing from a level less than to a level greater than the predetermined level, the resistance value of photocell 30 decreases. As the resistance value of photocell 30 decreases, less of the battery potential is dropped thereacross, consequently, the potential appearing across junction 41 and point of reference or ground potential 5 increases until it reaches a value at which it is of sufficient magnitude to produce base-emitter drive current through type NPN input transistor 25. At this time, input transistor 25 conducts through the collector-emitter electrodes to place the base electrode 36 of output transistor 35 at substantially the same potential level as the emitter electrode 38 thereof, a condition which extinguishes output transistor 35. Consequently, the trigger circuit is operated to the other operating state during which output transistor 35 does not conduct through the collector-emitter electrodes to interrupt the circuit through which energizing current is supplied to operating coil 15 of relay 10. With operating coil 15 deenergized, movable contacts 11 and 12 of relay 10 are operated out of electrical engagement with respective stationary contacts 13 and 14 to extinguish the vehicle exterior lighting system with conditions of ambient light greater than the predetermined level.

Assuming that the vehicle is at a location in which the condition of ambient light is less than the predetermined magnitude, the resistance value of photocell 30 is high. Consequently, the potential appearing across junction 41 and point of reference or ground potential 5 does not charge capacitor 40 to a direct current potential level of a sufficient magnitude to produce base-emitter drive current through input transistor 25. Consequently, upon the operation of ignition switch 9 to the electrical circuit closed condition, input transistor 25 remains not conductive. However, under these conditions, the potential appearing across junction 46 and point of reference or ground potential 5 is of sufficient magnitude to produce base-emitter drive current through type NPN output transistor 35, a condition which triggers this device conductive through the collector-emitter electrodes. Consequently, the trigger circuit is operated to the one operating state during which a circuit is established through output transistor 35 to supply energizing current to operating coil 15 of relay 10. With operating coil 15 energized, movable contacts 11 aNd 12 are operated into electrical engagement with respective stationary contacts 13 and 14 to immediately energize the vehicle exterior lighting system.

Should the vehicle be operated under conditions of ambient light of a level greater than the predetermined level an encounter conditions of ambient light of short duration which are of a level less than the predetermined level, such as in short tunnels or under freeway overpasses, the resistance value of photocell 30 would immediately increase. However, the resulting decrease of magnitude of the potential appearing upon junction 41 would not immediately extinguish input transistor 25 as the charge upon capacitor 40 would remain at a sufficient magnitude to maintain base-emitter drive current through input transistor 25 of the trigger circuit to maintain this device conductive. Consequently, the vehicle exterior lighting system is not unnecessarily energized with conditions of ambient light of short duration of a level less than the predetermined level as capacitor 40 maintains input transistor 25 conductive and, therefore, output transistor 35 not conductive for a period of time as determined by the RC time constant of the discharge circuit. Should the vehicle be operated under conditions of ambient light of a level less than the predetermined level and encounter conditions of ambient light of short duration which are of a level greater than the predetermined level, such as the light from oncoming vehicle headlights or illuminated highway intersections, the resistance value of photocell 30 would immediately decrease. However, the resulting increase of magnitude of the potential appearing upon junction 41 would not immediately trigger input transistor 25 conductive but would begin to charge capacitor 40. consequently, the vehicle exterior lighting system is not unnecessarily deenergized with conditions of ambient light of short duration greater than the predetermined level. From this description, it is apparent that capacitor 40 introduces a delay into the operation of the trigger circuit from either operating state to the other.

Should the vehicle be operated under conditions of ambient light less than the predetermined level and the exterior lighting system be energized, upon the operation of ignition switch 9 to the electrical circuit open condition by moving movable contact 9M out of electrical contact with stationary contact 9I, operating potential is removed from the collector-emitter electrodes of input transistor 25 of the trigger circuit. However, while movable contact 9M of ignition switch 9 is in electrical contact with stationary contact 9I, a circuit is completed for charging capacitor 45 which may be traced from the positive polarity terminal of battery 8, through lead 16, movable contact 9M and stationary contact 9I of ignition switch 9, leads 39 and 47, diode 48, current limiting resistor 51, lead 52, capacitor 45, lead 53 the closed contacts of "On-Off" switch 3 and point of reference or ground potential 5 to the negative polarity terminal of battery 8. When capacitor 45 has become charged, the potential upon junction 55 is of a sufficient magnitude to produce base-emitter drive current through type NPN transistor 70 as the base electrode 71 thereof is connected to junction 55 through current limiting resistor 56. With the vehicle exterior lighting system energized, battery potential is also applied across the collector electrode 72 and emitter electrode 73 of type NPN transistor 70 which may be traced from stationary contact 13 of relay 10, through leads 61 and 62, current limiting resistor 63, the collector-emitter electrodes of transistor 70, the base-emitter electrodes of output transistor 35, common emitter resistor 29, the closed contacts of "On-Off" switch 3 and point of reference or ground potential 5. Consequently, after capacitor 45 has become charged, transistor 70 conducts through the collector-emitter electrodes to supply base drive current for output transistor 35 of the trigger circuit. As battery potential is maintained across the collector-emitter electrodes of output transistor 35 after the ignition switch 9 has been operated to the electrical circuit open condition, output transistor 35 remains conductive through the collector-emitter electrodes until capacitor 45 has discharged to a level at which it is no longer of a sufficient magnitude to maintain base drive current through transistor 70. At this time, transistor 70 extinguishes to interrupt the supply of base drive current to output transistor 35, a condition which extinguishes this device to interrupt the energizing circuit for operating coil 15 of relay 10. With operating coil 15 of relay 10 deenergized, movable contacts 11 and 12 operate out of electrical contact with respective stationary contacts 13 and 14 to deenergize the external lighting system a predetermined period of time after the ignition switch has been operated to the electrical circuit open condition. The duration of this predetermined period of time may be selected by adjusting the movable contact of potential 50.

Another feature of this circuit is the inclusion of a warning system which provides an audible alarm in the event the vehicle exterior lighting system is operated through conventional headlamp switch 4 rather than the control circuit of this invention and ignition switch 9 is operated to the electrical circuit open condition. With movable contact 4M2 of headlamp switch 4 in electrical contact with either stationary contact pairs 4S5 or 4S6 and with movable contact 9M of ignition switch 9 operated to the electrical circuit open condition, a circuit is established for emitter-base drive current through type PNP transistor 80 which may be traced from the positive polarity terminal of battery 8, through trail lamp fuse 21, lead 22, movable contact 4M2 and either of stationary contact pairs 4S5 or 4S6 of headlamp switch 4, leads 33 and 24 and 61, the emitter electrode 83 and base electrode 81 of transistor 80, current limiting resistor 84, and leads 47, 39 and 85 to point of reference or ground potential 5 through several ground circuit paths such as the oil pressure switch, the gasoline gauge and the gasoline gauge sender which are electrically connected to stationary contact 9I of ignition switch 9 through lead 85. Upon the opening of the door, movable contact 91 of door jamb switch 90 moves into electrical contact with stationary contact 92 to place ground upon the collector electrode 82 of type PNP transistor 80. Consequently, this device conducts through the emitter-collector electrodes to supply energizing current through diode 87 to a conventional electrical type buzzer 88 which sounds an audible warning that the vehicle exterior lighting system is illuminated through headlamp switch 4 and the ignition switch has been operated to the electrical circuit open condition. When headlamp switch 4 is in the "Off" position, movable contact 4M2 and associated stationary contact pair 4S4 provide a short circuit across the base-emitter electrodes of transistor 80 through lead 86 and leads 33, 24 and 61 which prevents spurious operation of the buzzer circuit.

While a preferred embodiment of the present invention has been shown and described, it will be obvious to those skilled in the art that various modifications and substitutions may be made without departing from the spirit of the invention which is to be limited only within the scope of the appended claims.

What is claimed is:

1. A vehicle exterior lighting system control circuit comprising in combination with the vehicle head lamps and tail lamps, a source of electrical power and an ignition switch operable to electrical circuit open and close conditions: an electrical switching device of the type operable to the electrical circuit closed condition in response to an electrical current for establishing energizing circuits for said vehicle headlamps and tail lamps across said source of electrical power, a trigger circuit having input and output transistors and two operating states, one for establishing and the other for interrupting a circuit for the flow of said electrical current for said electrical switching device while said ignition switch is operated to the electrical circuit closed condition, a light sensitive control element responsive to conditions of ambient light for operating said trigger circuit to said one operating state with conditions of ambient light less than a predetermined level and to said other operating state with conditions of ambient light greater than said predetermined level, and a time delay circuit disposed between said input transistor of said trigger circuit and said light sensitive control element for introducing a delay in the operation of said trigger circuit from either said operating state to the other.

2. A vehicle exterior lighting system control circuit comprising in combination with the vehicle headlamps and tail lamps, a source of electrical power and an ignition switch operable to electrical circuit open and closed conditions: an electrical switching device of the type operable to the electrical circuit closed condition in response to an electrical current for establishing energizing circuits for said vehicle headlamps and tail lamps across said source of electrical power, a trigger circuit having input and output transistors and two operating states, one for establishing and the other for interrupting a circuit for the flow of said electrical current for said electrical switching device while said ignition switch is operated to the electrical circuit closed condition, a light sensitive control element responsive to conditions of ambient light for operating said trigger circuit to said one operating state with conditions of ambient light less than a predetermined level and to said other operating state with conditions of ambient light greater than said predetermined level, a first time delay circuit disposed between said input transistor of said trigger circuit and said light sensitive control element for introducing a delay in the operation of said trigger circuit from either said operating state to the other, and a second time delay circuit for maintaining said trigger circuit in said one operating state for a predetermined period of time after said ignition switch has been operated to the electrical circuit open condition.

3. A vehicle exterior lighting system control circuit comprising in combination with the vehicle headlamps and tail lamps, a source of electrical power and an ignition switch operable to electrical circuit open and closed conditions: an electrical relay having an operating coil and two normally open contacts operable to the electrical circuit closed condition in response to the energization of said operating coil for establishing respective energizing circuits for said vehicle headlamps and tail lamps across said source of electrical power, a trigger circuit having input and output transistors and two operating states, one for establishing and the other for interrupting the energizing circuit of said operating coil of said electrical relay while said ignition switch is operated to the electrical circuit closed condition, a light sensitive control element responsive to conditions of ambient light for operating said trigger circuit to said one operating state with conditions of ambient light less than a predetermined level and to said other operating state with conditions of ambient light greater than said predetermined level, a first time delay circuit disposed between said input transistor of said trigger circuit and said light sensitive control element for introducing a delay in the operation of said trigger circuit from either said operating state to the other, and a second time delay circuit for maintaining said trigger circuit in said one operating state for a predetermined period of time after said ignition switch has been operated to the electrical circuit open condition.

* * * * *